(12) United States Patent
Sugita

(10) Patent No.: US 7,391,945 B2
(45) Date of Patent: Jun. 24, 2008

(54) SENSOR DEVICE

(75) Inventor: Mitsuro Sugita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/276,205

(22) Filed: Feb. 17, 2006

(65) Prior Publication Data

US 2006/0193552 A1 Aug. 31, 2006

(30) Foreign Application Priority Data

Feb. 25, 2005 (JP) ............................. 2005-051997

(51) Int. Cl.
*G02B 6/00* (2006.01)
*H01L 21/00* (2006.01)

(52) U.S. Cl. .......................................... 385/122; 438/69
(58) Field of Classification Search ........................ None
See application file for complete search history.

(56) References Cited

U.S. PATENT DOCUMENTS

| 6,788,863 B2 * | 9/2004 | Parker et al. ................. 385/122 |
| 7,171,095 B2 | 1/2007 | Sugita et al. |
| 2005/0287696 A1 * | 12/2005 | Dumais et al. ................ 438/69 |

FOREIGN PATENT DOCUMENTS

JP 10-337173 12/1998

* cited by examiner

*Primary Examiner*—Sung Pak
*Assistant Examiner*—Hoang Tran
(74) *Attorney, Agent, or Firm*—Fitzpatrick, Cella, Harper & Scinto

(57) ABSTRACT

A sensor device for detecting a substance contained in a fluid comprises first and second photonic crystal regions, first and second flow channels, an optical waveguide connected to the first and second photonic crystal regions and an optical detector for detecting the lights transmitted through the first photonic crystal region and the waveguide and transmitted through or reflected by the second photonic crystal region.

3 Claims, 11 Drawing Sheets

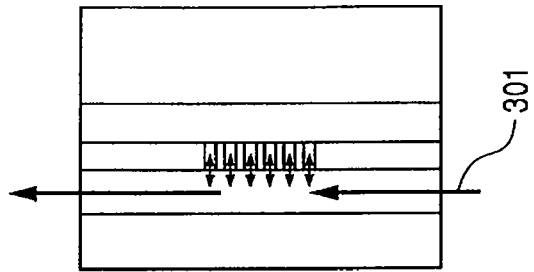
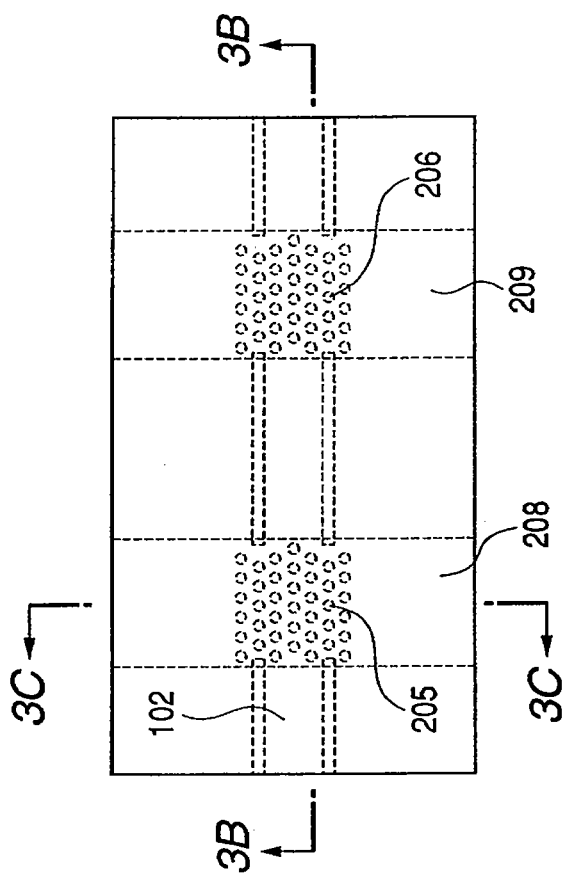
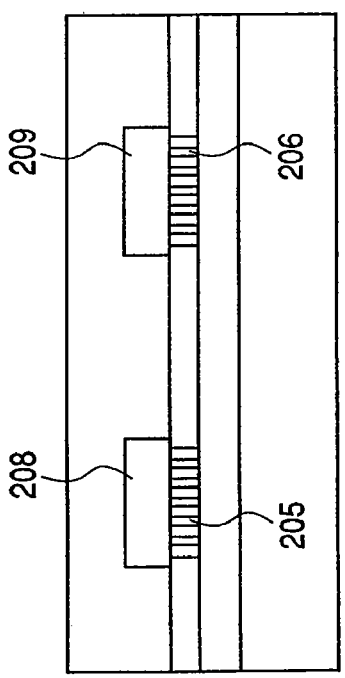

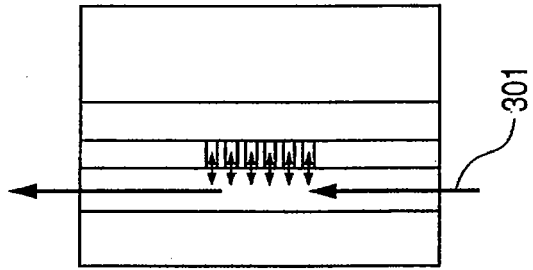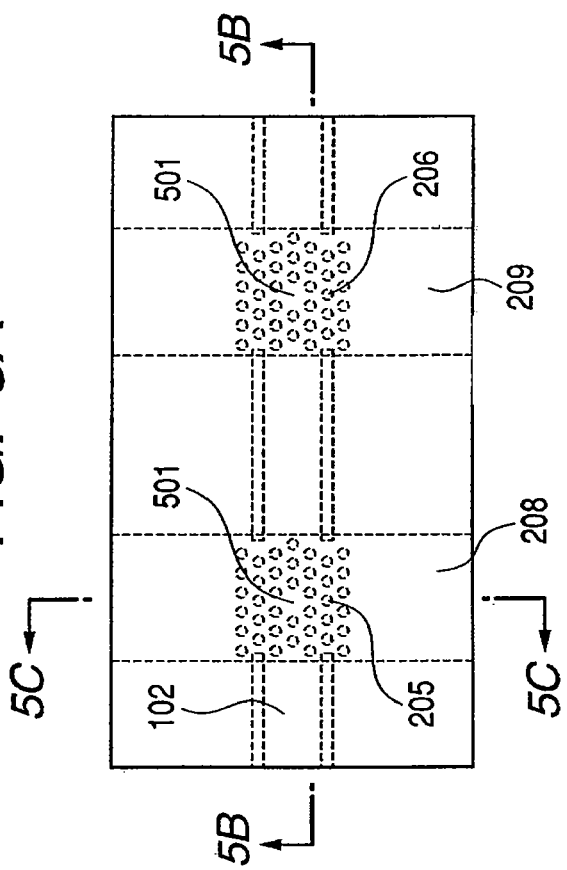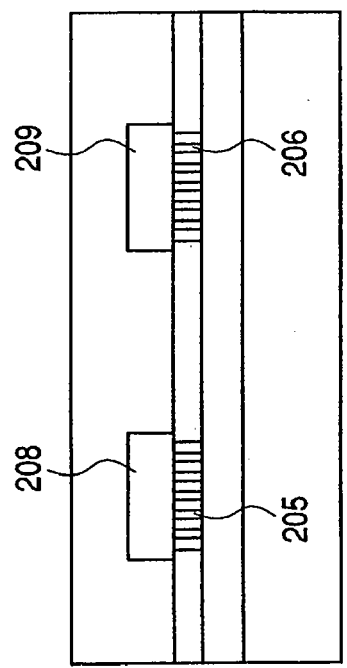

SENSOR DEVICE

BACKGROUND OF THE INVENTION

1. Field of the Invention

The present invention relates to a sensor device of a microanalysis system (μ-TAS) for detecting a concentration, a fine pressure distribution, a fine temperature distribution, biological information, genetic information, and so forth of a substance flowing through a flow channel of the system.

2. Related Background Art

Recently, techniques are being developed for microanalysis in chemistry, biochemistry, and the like fields by use of a much smaller system. A typical example is a μ-TAS system which employs a micro flow channel, which enables separation/mixing, reactions, and so forth by a much smaller flow channel.

With development of biotechnology and bio-industry, detection elements like DNA chips are being developed and commercialized for reading bio-genetic information.

With the development of three-dimensional working techniques, chemical analysis systems are attracting attention which are constituted of liquid elements such as a micro flow channel, a pump, and a valve, and a sensor in integration on a substrate made of glass, silicon, or the like to conduct chemical analysis. Such a system is called a miniaturized analysis system, μ-TAS (micro total analysis system), or a lab-on-a-chip. The miniaturized chemical analysis system enables decrease of a dead volume in the system, remarkable decrease of a sample quantity, shortening of analysis time, and saving of power consumption of the total system. Further, cost-down of the system can be expected by the miniaturization. Owing to such advantages, the μ-TAS is promising in application in biotechnology fields such as in medical treatment like home medical care, and a bedside monitor; in biotechnology fields such as DNA analysis, and proteome analysis.

Japanese Patent Application Laid-Open No. H10-337173 discloses a micro-reactor which conducts sequential biochemical experimental operations of mixing solutions causing a reaction of the mixture, analyzing a component, and separating the component by employing combination of several cells. FIG. 11 shows schematically a structure of a micro-reactor. In FIG. 11, micro-reactor 1111 has independent reaction chambers closed by a flat plate on a silicon substrate. The reactor is constituted of reservoir cell 1112, mixing cell 1113, reaction cell 1114, detection cell 1115, and separation cell 1116. With plural reactors formed on a substrate, plural biochemical reaction can be simultaneously and concurrently conducted. Further, not only the analysis, but also a substance synthesis reaction such as protein synthesis can be conducted by use of the cells.

Such a μ-TAS system or a bib-chip requires a final detection step after the reaction or other operation steps. In the detection step, a light beam is useful as the precise detecting means less affective to the objective substance owing to non-contacting and non-reactive properties of the light.

In an example of the detection procedure, an objective substance is labeled with a fluorophor, an exciting light beam is projected to the objective substance, and the fluorescence is detected. In another example of the detection procedure, a light beam is projected to the objective substance, and light transmittance is measured. In still another example of the detection procedure, the light beam is projected to an objective substance through a prism brought close to the objective substance and the loss of the total reflection light is measured.

In the fluorescence labeling method, a desirable label, namely a label sufficiently sensitive for the detection, is not necessarily applicable owing to compatibility between the objective substance and the labeling substance. Further, in this method, the fluorescence as the signal component is interfered less by the intense exciting light as a noise because of the wavelength difference between the exciting light and the fluorescence advantageously, but the generation efficiency of the fluorescence as the signal component cannot readily be raised, which renders difficult to improve the total SN ratio.

In the light transmission measurement method or the light absorbance measurement method utilizing the transmitted light, when the objective substance is contained in a high concentration in the measurement fluid to exhibit a low transmittance, the signal is weak to result in a lower SN ratio. On the other hand, in this method, when the concentration of the objective substance is lowered to solve the above disadvantage, the original signal becomes weak to lower the SN ratio, also. Furthermore, even though the influence of the light is not remarkable, the light penetrating through the objective fluid may cause heat generation or a photoreaction, so that the intensity of the light should be limited.

In the total reflection loss measurement method, more intense light can be used than in the light transmission measurement method. However, the wavelength of the light for detection of a change or loss and the wavelength of the irradiated light are the same, which requires extremely large dynamic range of the detector, disadvantageously. Therefore, with this measurement method, a slight loss by a slight degree of reaction in the micro flow channel cannot be measured with a high accuracy.

On the other hand, a sensor device employing a photonic crystal, which has a high sensitivity, tends to detect an external disturbance as a noise component.

The external disturbance includes a fluctuation of a concentration, a temperature, and a density. The photonic crystal region itself and the substrate connected thermally to the photonic crystal region change in the temperature in various manners depending on the measurement operation environment. This is different from a high-cost or large-sized constitution which is equipped with a temperature-controlling feedback system, namely a temperature sensor, a heater/cooler element, a control circuit, or a power source. The constitution of small integration or a low cost cannot be equipped with such a temperature control means.

In particular, in a detection device in which a concentration of a biological substance as the objective substance in a solution flowing through a flow channel is measured, the measurement is conducted in a sequence of operation steps: (1) firstly a buffer solution containing no biological substance is allowed to flow through the flow channel, (2) secondly a buffer solution containing a biological substance is allowed to flow through the flow channel, and (3) finally a buffer solution containing no biological substance is allowed to flow through the flow channel to detect the difference from the initial level. In such an operation sequence, fluctuation of the concentration, temperature, or density of the buffer solution directly causes fluctuation of the baseline to produce a noise component. To decrease the temperature fluctuation, a means should be equipped for keeping the temperature constant in the aforementioned measurement region, and further a means should be equipped for keeping constant the temperature of the buffer solution before entering the measurement region. This causes a cost increase and a larger size of the device.

SUMMARY OF THE INVENTION

The present invention intends to provide a sensor device which is less affected by external disturbance The present invention provides a device for detecting a substance contained in a fluid, comprising a first photonic crystal region; a second photonic crystal region; a first flow channel connected to the first photonic crystal region to allow a reference fluid to flow; a second flow channel connected to the second photonic crystal region to allow an objective substance-containing fluid to flow; an optical waveguide connected to the first photonic crystal region and the second photonic crystal region to guide the light; and an optical detector for detecting the light which has transmitted through the first photonic crystal region and the waveguide and has transmitted or been reflected by the second photonic crystal region.

The sensor device of the present invention in which plural photonic crystal regions are optically connected enables decrease of a noise component caused by external disturbance.

The sensor device of the present invention in which plural photonic crystal regions are optically connected is useful in apparatuses employing a micro flow channel, the apparatus including micro-chemical or micro-biochemical analysis apparatuses such as a μ-TAS system and a bio-analysis chip, and portable inspection apparatuses.

The present invention is not limited by the examples described below, but the sequence of the flows and other matters may be modified in various manners within the gist of the present invention.

As many apparently widely different embodiments of the present invention can be made without departing from the spirit and scope thereof, it is to be understood that the invention is not limited to the specific embodiments thereof except as defined in the claims.

Other features and advantages of the present invention will be apparent from the following description taken in conjunction with the accompanying drawings in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A, 3B, and 3C illustrate schematically the sensor device of Example 1 of the present invention.

FIGS. 5A, 5B, and 5C illustrate schematically the sensor device of Example 2 of the present invention.

DETAILED DESCRIPTION OF THE PREFERRED EMBODIMENTS

In the present invention, the "photonic crystal" is a structure having the refractivity changing periodically, including specifically flat materials in the form of flat plates having holes periodically arranged therein, laminates thereof, assemblage of columns, and prisms. In the present invention, in particular, nearly flat plates having two-dimensional arrangement are suitable.

Figure 2:
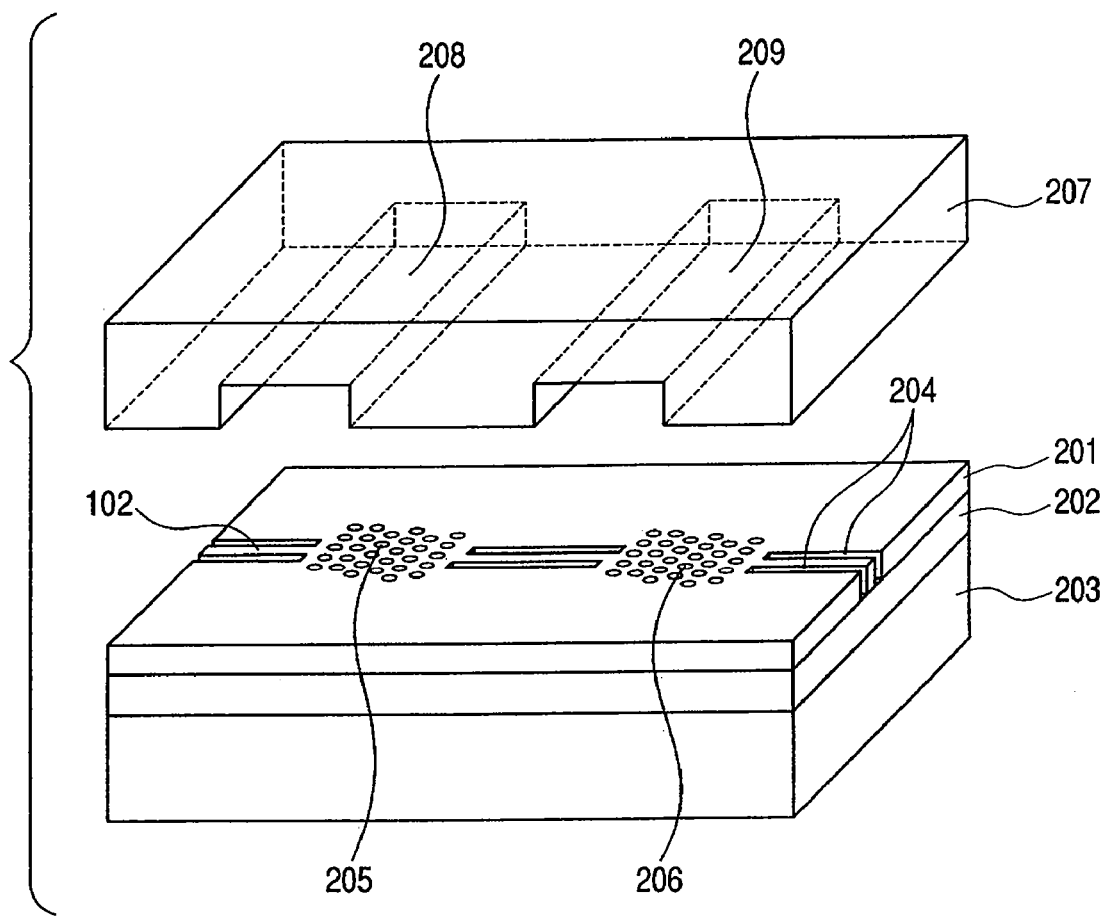
FIG. 2 illustrates schematically the sensor device of Example 1 of the present invention.

The present invention is explained below specifically by reference to FIG. 2

The sensor device of the present invention comprises first photonic crystal region 205; second photonic crystal region 206; first and second flow channels 208,209 connected respectively to first and second photonic crystal regions 205, 206; optical waveguide 102 for introducing light to the first and second photonic crystal regions; and an optical detector (106 in FIG. 1) which detects the light having transmitted through the first photonic crystal region 205 and having transmitted through or reflected by second photonic crystal region 206.

Suppression of an external disturbance is shown later in Example 1 in the case where the first photonic crystal region and the second photonic crystal region are different from each other in an optical property (e.g., spectral transmittance).

Further, suppression of an external disturbance is shown later in Examples 2 and 3 in the cases where the first photonic crystal region and the second photonic crystal region have has same optical property.

In the present invention, the first photonic crystal and the second photonic crystal are connected in series, and the incident light transmits through the first photonic crystal region and reaches the second photonic crystal region. Even when an external disturbance causes a change in spectral transmittance in the respective photonic crystal regions, the change caused is the same in the respective regions. The present invention utilizes this effect.

The present invention offsets an influence of an external disturbance as mentioned above.

The sensor device of the present invention can be constituted also as shown below. For example, the sensor device comprises two or more photonic crystal regions, an optical waveguide for connecting optically serially the photonic crystal regions, a light source for emitting a light flux to be transmitted through or reflected by the photonic crystal regions to give output light, and an optical detector. From the information derived from the output light, an environmental condition is detected at or around the photonic crystal regions.

The aforementioned plural photonic crystal regions are preferably constituted of a transmission type of first and second photonic crystal regions, and the photonic band edge wavelength at the short wavelength side of the first photonic crystal region and the photonic band edge wavelength at the long wavelength side of the second photonic crystal region are preferably close to each other.

In the aforementioned plural photonic crystal regions, the constituting regions are the same or nearly the same photonic crystal regions, and the respective photonic crystal regions are preferably of a transmission type and are preferably connected optically serially.

The aforementioned plural photonic crystal regions are the same or nearly the same, and the respective photonic crystal regions comprises preferably a transmission type region and a reflection type region, and the photonic crystal regions are preferably connected optically serially.

The environmental conditions at or around the photonic crystal regions to be detected include a temperature, a pressure, a refractivity change, presence of an objective substance, a concentration of an objective substance, and a concentration of a solute in the solution.

EXAMPLES

The present invention is explained below more specifically by reference to examples.

Example 1

Two photonic crystals different in a property are optically connected serially, and sensing is conducted by utilizing transmitted light having transmitted through the two photonic crystals. The entire constitution of the sensor device of this Example is explained by reference to FIG. 1.

Figure 1:
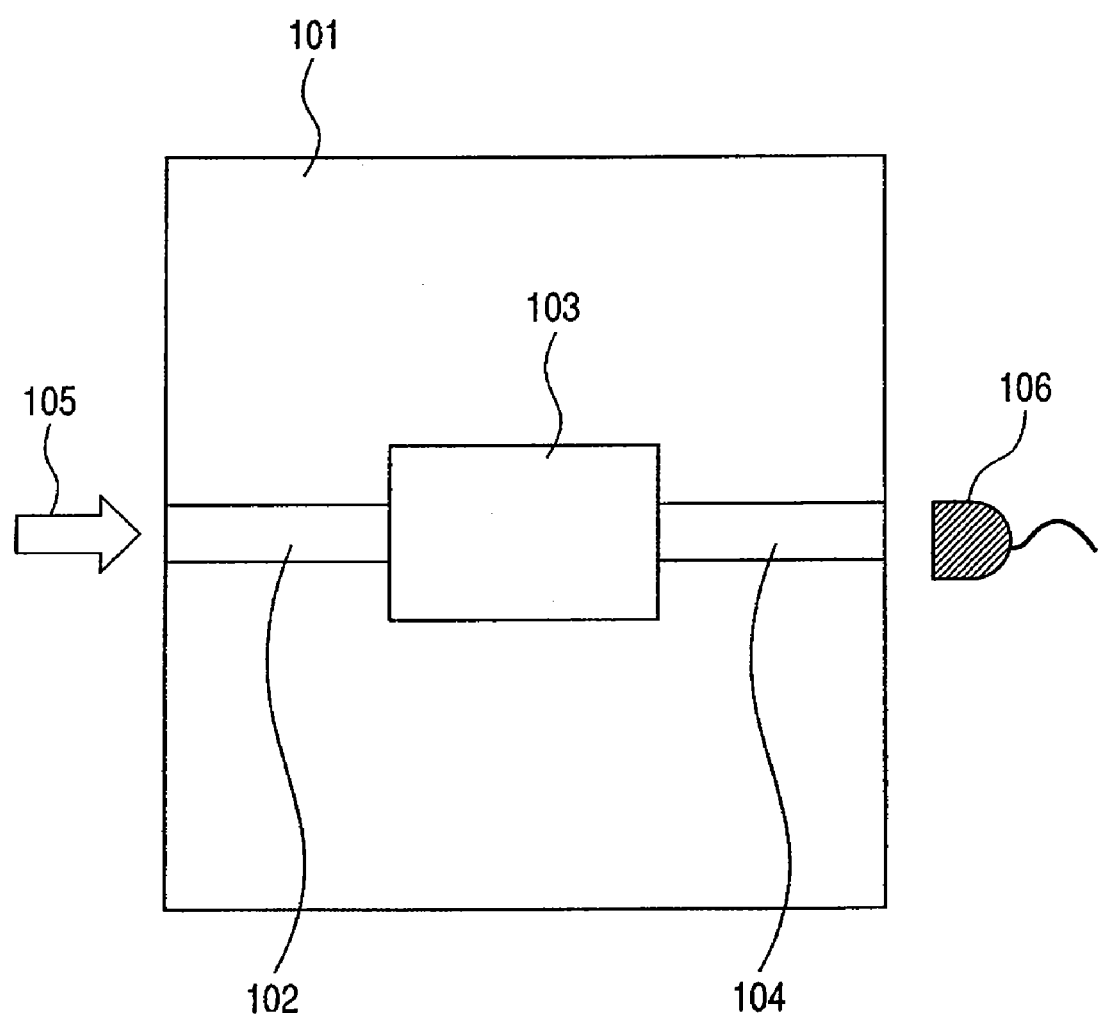
FIG. 1 illustrates schematically a constitution of the sensor device of Example 1 of the present invention.

In FIG. 1, on substrate 101, photonic-crystal optical element system 103 is placed between light-introduction-side optical waveguide 102 and output-side optical waveguide 104. Incident light 105 is introduced from the outside of the element for measurement of the spectral transmittance of the photonic crystal optical element system. Optical detector device 106 detects the light having transmitted through optical waveguide 102, photonic crystal optical element system 103, and optical waveguide 104.

The photonic crystal optical element system in combination with a micro flow channel mentioned below will change its spectral transmissivity in accordance with an environmental change caused by contact with an objective fluid or by flow of an objective fluid nearby. This change is detected by a change of the optical spectrum shape, or a change in the light transmittance at a fixed wavelength. When the wavelength is fixed, the wavelength may be taken in plurality: for example, two wavelengths, or three wavelengths. The measurement at many wavelengths corresponds to the aforementioned measurement of optical spectrum shape.

For optical coupling of the incident light and outgoing light with the outside of the element, various optical coupling systems are useful, the useful systems including optical fibers, sphere-tipped optical fibers, GRIN lens optical fibers, wedge-shaped optical fibers, fiber bundles, lens coupling systems including a microscope objective lens, diffraction grating type coupling elements, and so forth.

This Example is explained in more detail by reference to FIG. 2 and FIGS. 3A-3C. In this Example, the photonic crystal optical element system has two photonic crystals 205, 206 and an optical waveguide between the photonic crystals. The two photonic crystals are arranged in series, and the detection is conducted by utilizing spectral transmittance of the light transmitting through this series. In this Example, first photonic crystal 205 and second photonic crystal 206 are different in the constitution, and are different in the spectral transmissivity. Specifically, the photonic band gap of the first photonic crystal and the photonic band gap of the second photonic crystal combined thereto are shifted from each other not to be completely superposed. This shifted state is described later in connection with the method of the detection.

In this Example, the photonic crystals and the optical waveguide (102-104 in FIG. 1) are formed on an SOI wafer (silicon on insulator). In FIG. 2, perspective illustration of an example, optical waveguide core 201 is made of Si (SOI layer); optical guide cladding 202 is made of $SiO_2$ (BOX layer); and the substrate 203 is made of Si. SOI layer 201 as the optical waveguide core has a thickness of about 0.2 μm. Optical waveguide 102 is formed by a two-trench structure (204 in FIG. 2) to form air interfaces to confine the light. The interval between the trench pair is the optical guide breadth, and is about 10 μm in this Example. The trench breadth is 1 μm in consideration of the light exudation breadth and the light exudation quantity. The photonic crystal is constituted of arrangement of cylindrical holes of about 200 nm diameter and an aspect of about 1 in a triangular lattice state of about 400 nm period in an area of about 15 μm square. The wavelength of the detection light is in about 1.5 μm band region. The micro flow channel has a thickness of about 100 μm, a breadth of 100 μm. These may be changed suitably in a wide range from about 10 μm to about 1 mm.

The material of the substrate for constituting the photonic crystals and the optical waveguides may be an SOI wafer, or a like material such as a silicon nitride film formed by CVD growth on a glass plate, a relatively high-refractivity Teflon® resin formed on low-refractivity mesoporous silica, and so forth. The material may be selected suitably in view of the light wavelength, the production cost, environmental resistance, and so forth.

The substrate supporting the photonic crystal optical element system and the optical waveguide is covered with a micro flow channel element 20. The flow channel element is made of an adsorbent PDMS (polydimethylsiloxane) resin, and adheres to the clean Si surface by self-adsorption. The micro flow channel element 207 has two flow channels 208, 209. First flow channel 208 is placed on first photonic crystal 205, and second flow channel 209 is placed on second photonic crystal 206. The fluids are allowed to flow as shown by arrow mark 301. FIGS. 3A-3C show this state.

Figure 4A:
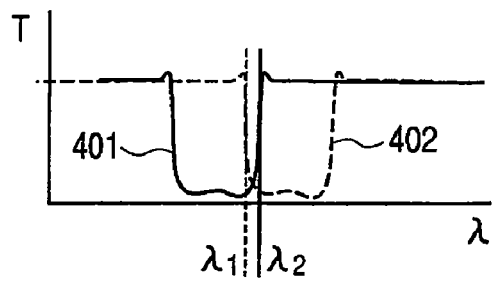
FIGS. 4A, 4B, 4C, 4D, 4E, and 4F are drawings for explaining the method for suppressing external disturbance by the sensor device of Example 1 of the present invention.
Figure 4B:
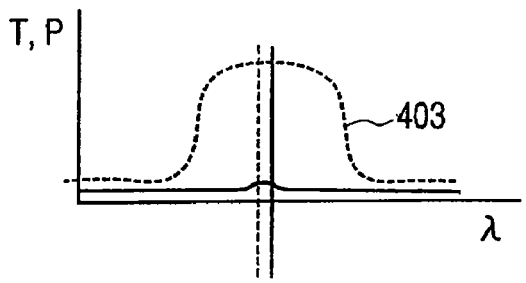
Figure 4C:
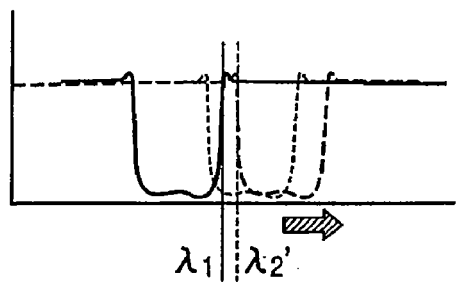
Figure 4D:
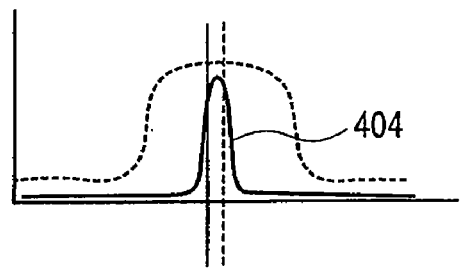
Figure 4E:
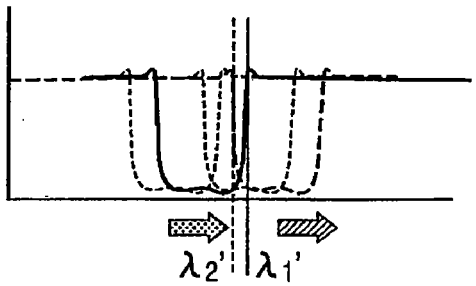
Figure 4F:
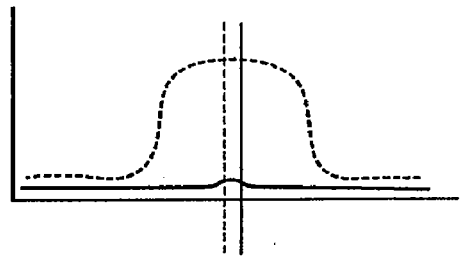

A sensing process by the sensor element constituted of the aforementioned micro flow channel element and the optical element is described by reference to FIGS. 4A-4F. This sensing process offsets external disturbance to achieve the purpose of the present invention. FIGS. 4A, 4C, and 4E show a spectral transmittance 401 of light passing through the first photonic crystal and a spectral transmittance 402 of light passing through the second photonic crystal. FIGS. 4B, 4D, and 4F show respectively a total spectral transmittance 404 of light passing through the series of the first and second photonic crystals, and the intensity spectrum 403 of the light source for the detection.

The process is described below.

(FIG. 4A) In this Example, the long wavelength edge λ1 of the photonic band gap of the first photonic crystal and the short wavelength edge λ2 of the corresponding photonic band gap of the second photonic crystal are placed at nearly the same position (wavelength), and at the initial state, λ1>λ2. In the initial state, the same reference fluid, such as a buffer solution and a control solution, is allowed to flow through first flow channel 205 and second flow channel 206 both.

(FIG. 4B) Incident light 403 is selected to have a spectrum so as to include the wavelengths of λ1 and λ2, and to cover a wavelength range narrower than the two photonic band gaps but to be as broad as possible. The incident light has preferably a flat spectrum within the band gap range. With the above-mentioned incident light, in the constitution shown by FIG. 4A, the total spectral transmittance is nearly zero, since the total spectral transmittance which is a multiplication product of the two spectral transmittances is low over the entire range of the incident light wavelength. That is the initial state of this sensing system.

(FIG. 4C) Next, a second fluid is allowed to flow through second flow channel 209. This fluid is, for example, a buffer solution containing a protein dissolved therein to be determined for the concentration. This fluid flow causes a change in the spectral transmittance in the second photonic crystal, the spectral transmittance wavelength being shifted toward a long wavelength side as shown in FIG. 4C. Thereby, the relation of $\lambda 1 > \lambda 2$ in the initial state comes to be not valid.

(FIG. 4D) Such reversion of $\lambda 1$ and $\lambda 2$ gives rise to a high-transmittance region in the total spectral transmittance 404. This high-transmittance region is in the wavelength range of the introduced light, giving a significant transmitted light intensity. The difference in the nature of the fluid flowing through first flow channel 208 from the fluid flowing through second flow channel 209 causes a change of the transmitted light intensity, enabling the sensing.

(FIG. 4E) Next, the operation of this sensing system is explained in the case where a common external disturbance occurs in the first and second flow channels and the first and second photonic crystals. The external disturbance is exemplified by a temperature change, and a change in the buffer solution. The distance between the first and second flow channels is about 300 μm which is sufficiently close to each other to undergo the same temperature change. If necessary, the distance may be shortened as mentioned before. To offset fluctuation of the buffer solution, the construction may be modified by employing the same fluid-feed source, and bringing close the branch of the first and second flow channels and the protein-mixing portion or the like to the photonic crystal portions to be affected similarly by the external disturbance in the two flow channels.

With such a constitution, when the influence of the external disturbance to the first and second photonic crystals is common, $\lambda 1$ and $\lambda 2$ are shifted together by nearly the same wavelength portion to $\lambda 1'$ and $\lambda 2'$ with the difference kept unchanged. Naturally, the relation of $\lambda 1' > \lambda 2'$ is also kept unchanged.

(FIG. 4F) As the result, the total spectral transmittance is low over the wavelength range of the incident light, and the transmitted light intensity is low.

As described above, the constitution and the detection method according to the present invention realizes a sensing system which does not detect external disturbance but detects only the difference between the fluids flowing through the first flow channel and the fluid flowing through the second flow channel.

Example 2

In this Example, two defect-containing photonic crystals having the same properties are optically connected in series, and sensing is conducted the utilizing transmitted light having transmitted through the two photonic crystals. The sensor device of this Example has a constitution similar to that shown in FIG. 1 as a whole. The photonic crystal element system is also similar to that in Example 1, and is shown in FIGS. 5A-5C. This example is different from Example 1 in first photonic crystal 205, second photonic crystal 206, and the incident light 105 for the detection.

In this Example, the two same photonic crystals are employed which have respectively a deficiency of a cylindrical hole and a defect-resonator 501. Thereby, the spectral transmittance of the photonic crystal has a sharp transmission peak corresponding to the defect level in the photonic band gap.

Figure 6A:
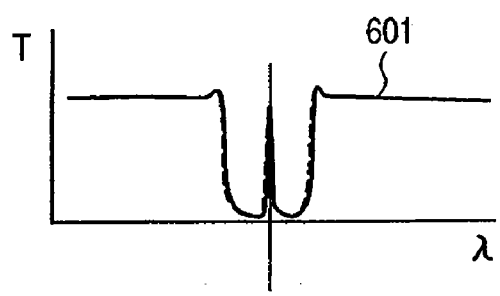
FIGS. 6A, 6B, 6C, 6D, 6E, and 6F are drawings for explaining the method for suppressing external disturbance by the sensor device of Example 2 of the present invention.
Figure 6B:
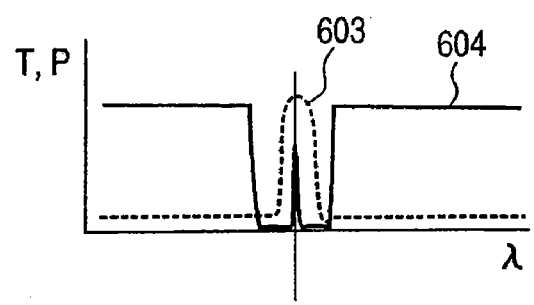
Figure 6C:
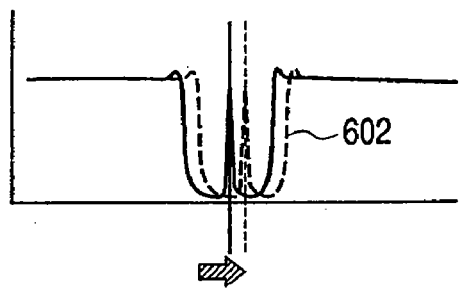
Figure 6D:
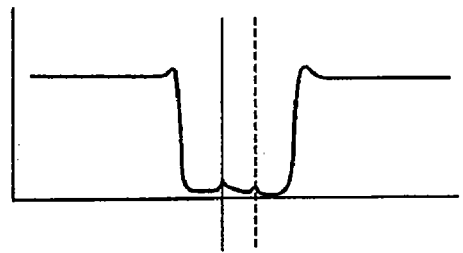
Figure 6E:
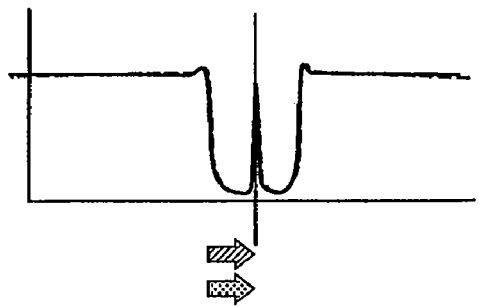
Figure 6F:
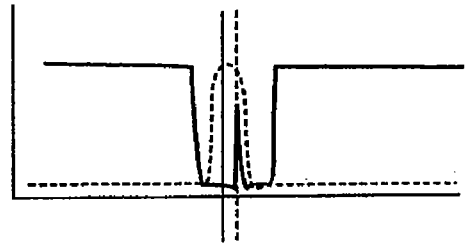

A sensing process by the sensor element constituted of the aforementioned micro flow channel element and optical element is described by reference to FIGS. 6A-6F. This sensing process offsets external disturbance to achieve the purpose of the present invention. FIGS. 6A, 6C, and 6E show a spectral transmittance 601 of the light passing through the first photonic crystal and a spectral transmittance 602 of the light passing through the second photonic crystal. FIGS. 6B, 6D, and 6F show respectively a total spectral transmittance 604 of the light passing through the series of the first and second photonic crystals, and the intensity spectrum 603 of the light source for the detection.

The process is described below.

(FIG. 6A) The first and second photonic crystals are the same. Therefore, the spectral transmittances 601 are superposed in the initial state.

(FIG. 6B) The introduced light has preferably a light intensity only within the photonic band gap, and has a spectrum as flat as possible within the range. The total spectral transmittance 604 of the system containing the two photonic crystals is the square of the spectral transmittance of the single photonic crystal. Since the defect level is within the incident light wavelength range, a sufficient intensity of the transmitted light is obtained. That is the initial state of the sensing system of this Example.

(FIG. 6C) Next, a second fluid is allowed to flow through second flow channel 209 only. This fluid is, for example, a buffer solution containing a protein dissolved therein to be determined for the concentration. This fluid flow causes a change in the spectral transmittance in the second photonic crystal, the spectral transmittance wavelength being shifted toward a long wavelength side as shown in FIG. 6C. Thereby, spectral transmittance 602 of the second photonic crystal, which is entirely superposed on spectral transmissivity 601 of the first photonic crystal in the initial state, comes to be shifted. This causes a wavelength shift of the transmittance peak of the defect level.

(FIG. 6D) By the wavelength shift of the spectral transmittance in the second photonic crystal, the high transmittance peak caused by the defect level comes to disappear from the total spectral transmittance 604. Consequently, no light is transmitted in the incident light wavelength range. The difference in the nature of the fluid flowing through first flow channel 205 from that flowing through second flow channel 206 causes a change of the transmitted light intensity. Thus the sensing can be conducted by utilizing this difference in the properties between the fluids flowing in first flow channel 205 and second flow channel 206.

(FIG. 6E) Next, the operation of this sensing system is explained in the case where a common external disturbance arises in the first and second flow channels and the first and second photonic crystals. The external disturbance is exemplified by a temperature change, and a change in the buffer solution. The distance between the first and second flow channels is about 300 μm which is sufficiently close to each other to undergo the same temperature change. If necessary, the distance may be shortened as mentioned before. To offset fluctuation of the buffer solution, the construction may be modified by employing the same fluid-feed source, and bringing close the branch of the first and second flow channels and the protein mixing portion to the photonic crystal portions to be affected similarly by the external disturbance in the two flow channels.

With such a constitution, when the influence of the external disturbance is common to the first and second photonic crystals, the two spectral transmittances shift together by nearly the same wavelength portion with the defect levels kept superposed.

(FIG. 6F) As the result, the total spectral transmittance has a transmission peak within the range of the wavelength range of the incident light, and the transmitted light is the same as in the initial state.

As described above, the constitution and detection method according to the present invention realizes a sensing system which does not detect external disturbance but detects only the difference in the fluids flowing through the first flow channel and the second follow channel.

Example 3

In this Example, two photonic crystals having the same properties are optically connected in series, and the sensing is conducted the utilizing the light transmitted through a first photonic crystal region and then reflected by the second photonic crystal region.

Optical Waveguide

Figure 7:
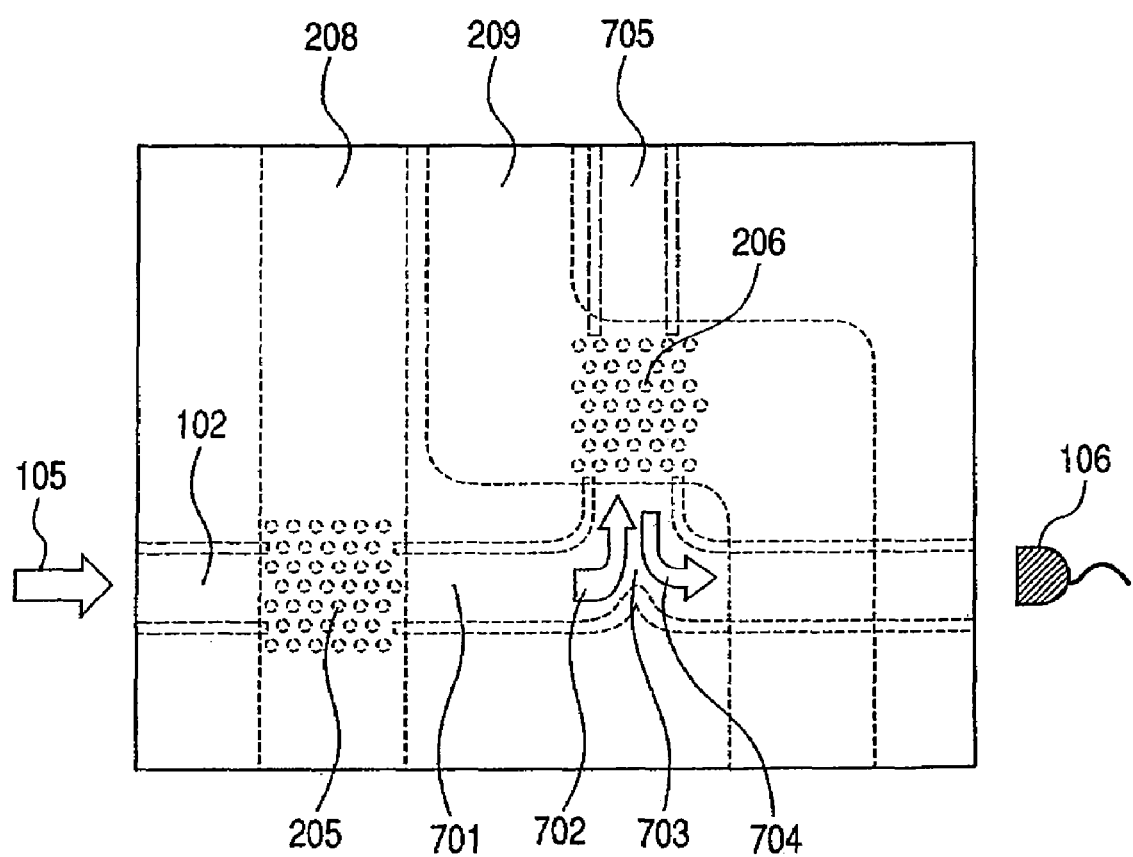
FIG. 7 illustrates schematically the sensor device of Example 3 of the present invention.

The sensor device of this Example has a constitution similar to that shown in FIG. 1 as a whole. FIG. 7 shows the constitution in more detail. In FIG. 7, first photonic crystal 205 and second photonic crystal 206 have the same properties, but the light is transmitted through the first photonic crystal and is reflected by the second photonic crystal, being different from the above Examples 1 and 2. For the optical connection of the transmitted light and the reflected light, Y-shaped coupling portion 703 is provided which is branched from optical guide 701 for the transmitted light into optical guides 705 for the light to be reflected. Thereby, transmitted light 702 is introduced to the second photonic crystal and reflected light 704 is guided to optical detector 106. The Y-shaped coupling portion may be modified suitably in the shape or other constitutions for adjusting the coupling ratio or the like. A beam splitter or an optical branch coupling system other than the Y-shaped one may be employed. Second micro flow channel 209 is bent to cross minimally over the Y-shaped coupling portion and the optical waveguide.

Figure 8A:
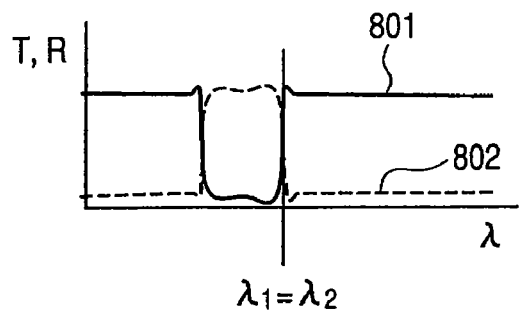
FIGS. 8A, 8B, 8C, 8D, 8E, and 8F are drawings for explaining the method for suppressing external disturbance by the sensor device of Example 3 of the present invention.
Figure 8B:
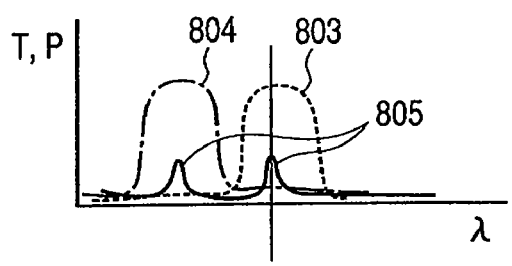
Figure 8C:
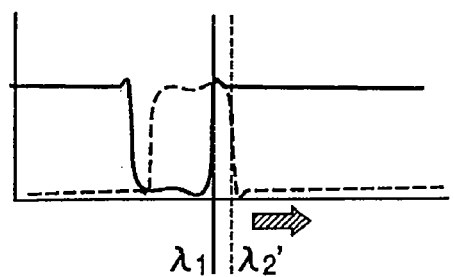
Figure 8D:
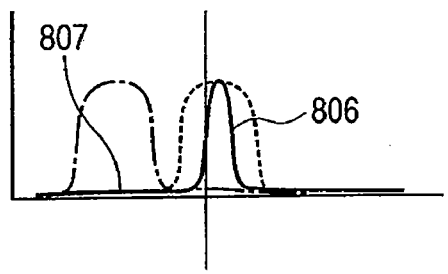
Figure 8E:
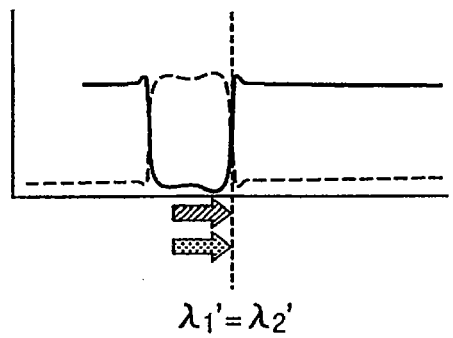
Figure 8F:
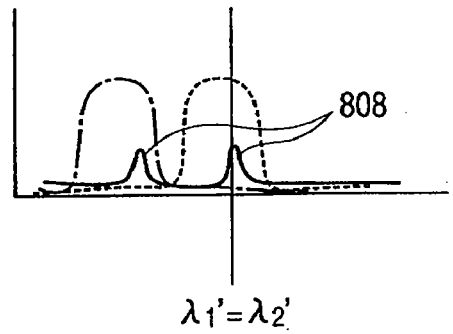

A sensing process is explained which is less affected by external disturbance. In the process, the sensing is conducted by a sensor element constituted of the aforementioned micro flow channel and the optical element to achieve the purpose of the present invention of offsetting external disturbance. The explanation is made by reference to FIGS. 8A-8F. FIG. 8A, FIG. 8C, and FIG. 8E are graphs showing spectral transmittance 801 of the light passing through the first photonic crystal and spectral reflectance 802 of the light reflected by the second photonic crystal. FIG. 8B, FIG. 8D, and FIG. 8F are graphs showing total spectral transmittances 805, 806, 807, and 808 of light having transmitted through the first photonic crystal and reflected by the second photonic crystal successively in the photonic crystal optical element system, and the intensity spectrums 803,804 of two light sources employed for the detection.

(FIG. 8A) The first photonic crystal and the second photonic crystal are the same. Therefore, in the initial state, the photonic band edges of spectral transmittance 801 and of spectral reflectance 802 overlap at the long wavelength-side edges and the short wavelength-side edges.

(FIG. 8B) One kind or two kinds of incident light fluxes are employed. First incident light 803 covers a broad wavelength range, containing the long wavelength-side edge of the photonic band gap. When second light is employed, the wavelength range is preferably selected not to overlap on the wavelength range of the first light. The second incident light covers a broad wavelength range, containing the short wavelength-side edge of the photonic band gap. Each of the incident light fluxes has preferably a light intensity spectrum as flat as possible in the light wavelength range.

Total spectral transmittance 805 is a multiplication product of the spectral transmittance and the spectral reflectance, and the transmission is obtained at the two edge portions only. The transmittance is about 25% at the highest. This highest transmittance is obtained at the wavelengths where the both of the transmittance and the reflectance are about 50%. The two wavelengths are respectively within the wavelength range of the first incident light or the second incident light. Therefore, for either of the incident light, an intermediate intensity can be obtained: about 25% of the maximum transmittance. The above state is the initial state of the sensing system of this Example.

(FIG. 8C) Next, a second fluid is allowed to flow in second flow channel 206. This fluid is, for example, a buffer solution containing a protein dissolved therein to be determined for the concentration. This fluid flow causes a change in the spectral reflectance at the second photonic crystal to shift the spectral reflectance wavelength toward a long wavelength side as shown in FIG. 8C. Thereby, spectral reflectance 802 of the second photonic crystal, which is overlapping at the edges on spectral transmittance 801 of the first photonic crystal in the initial state, shifts toward the long wavelength side.

(FIG. 8D) By the wavelength shift by the second photonic crystal, regarding total spectral transmittance 805, the transmittance at the transmission peak becomes larger at the long wavelength side, and the transmission peak at the short wavelength side disappears. Therefore, the total transmittance intensity of the first incident light increases, whereas the total transmittance intensity of the second incident light becomes zero. Therefore, sensing can be conducted by utilizing the change in the total transmittance by difference in properties between the fluids flowing first flow channel 205 and second flow channel 206.

(FIG. 8E) Next, the operation of this sensing system is explained in the case where a common external disturbance arises in the first and second flow channels and the first and second photonic crystals. The external disturbance is exemplified by a temperature change, and a change in the buffer solution. The distance between the first and second flow channels is about 300 μm which is sufficiently close to each other to undergo the same temperature change. If necessary, the distance may be shortened as mentioned before. To meet fluctuation of the buffer solution, the construction may be modified by employing the same fluid-feed source, and bringing close the branch of the first and second flow channels and the protein mixing portion to the photonic crystal portions to be affected similarly by the external disturbance in the two flow channels.

With such a constitution, when the influence of the external disturbance to the first and second photonic crystals is common, the two spectral transmissivities shift by nearly the same wavelength portion with the edges at the long wavelength-side and the short wavelength-side of the photonic band gaps kept overlapped.

(FIG. 8F) As the result, the total spectral transmittance has a transmission peak within the wavelength ranges of the first and second incident light intensities, at an intermediate transmittance, and the transmitted light is the same as in the initial state.

As described above, the constitution and detection method according to the present invention realizes a sensing system which does not detect external disturbance but detects only the difference in the fluids flowing through the first flow channel and the second follow channel.

The embodiment of this Example can be realized either with one incident light flux, or an additional second incident light flux. The use of the two light fluxes is advantageous: when the change caused by the second photonic crystal is a shift toward a short wavelength side, the total transmittance of the first incident light becomes zero, and the total transmittance of the second incident light is decreased; and from the decrease, the change can be detected. Thus the amount of the change toward a positive side as well as a negative side can be detected.

Example 4

Figure 9:
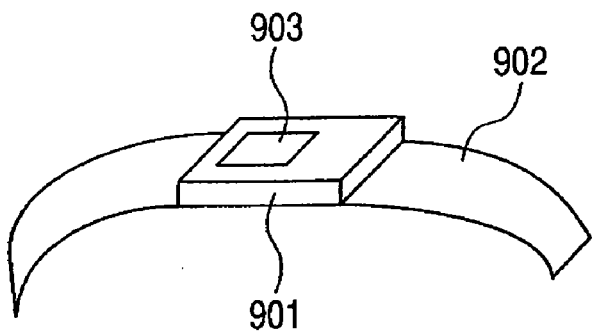
FIG. 9 illustrates schematically a personal wear type bio-sensor device.

Example 4 of the present invention is explained by reference to FIG. 9 and FIG. 10. FIG. 9 illustrates schematically a sensor device incorporating a sensor and flow channel element of the present invention in a shape of a wrist watch for wearing at a wrist or arm of a human body.

Figure 10:
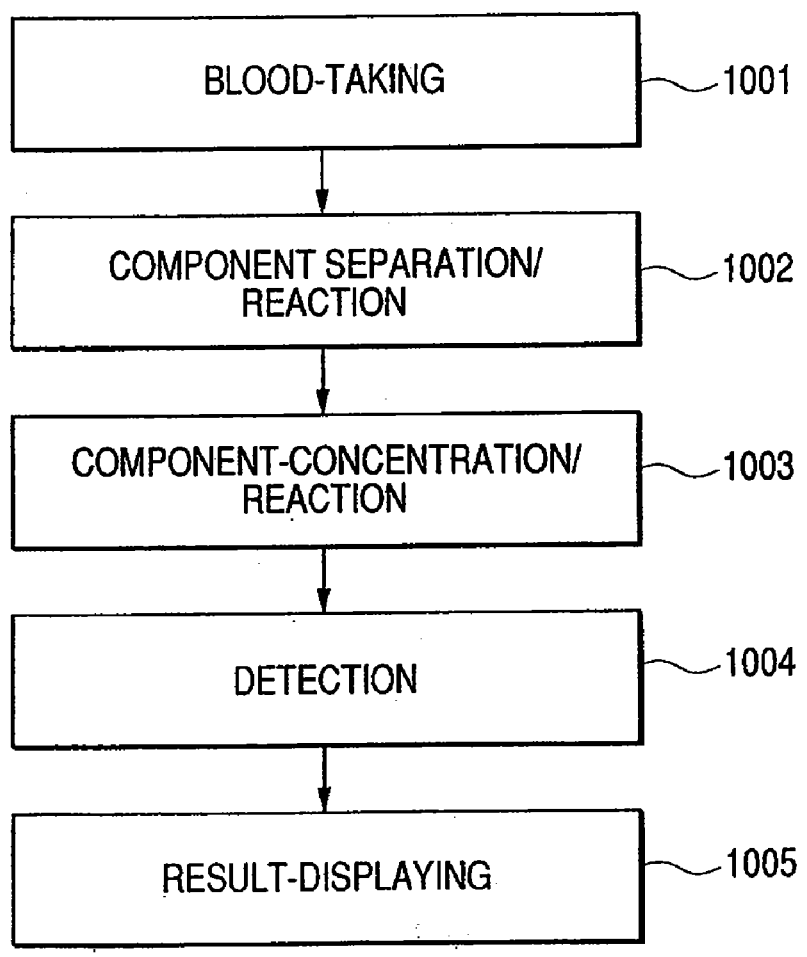
FIG. 10 shows a sensing process by an μ-TAS bio-sensor chip.
Figure 11:
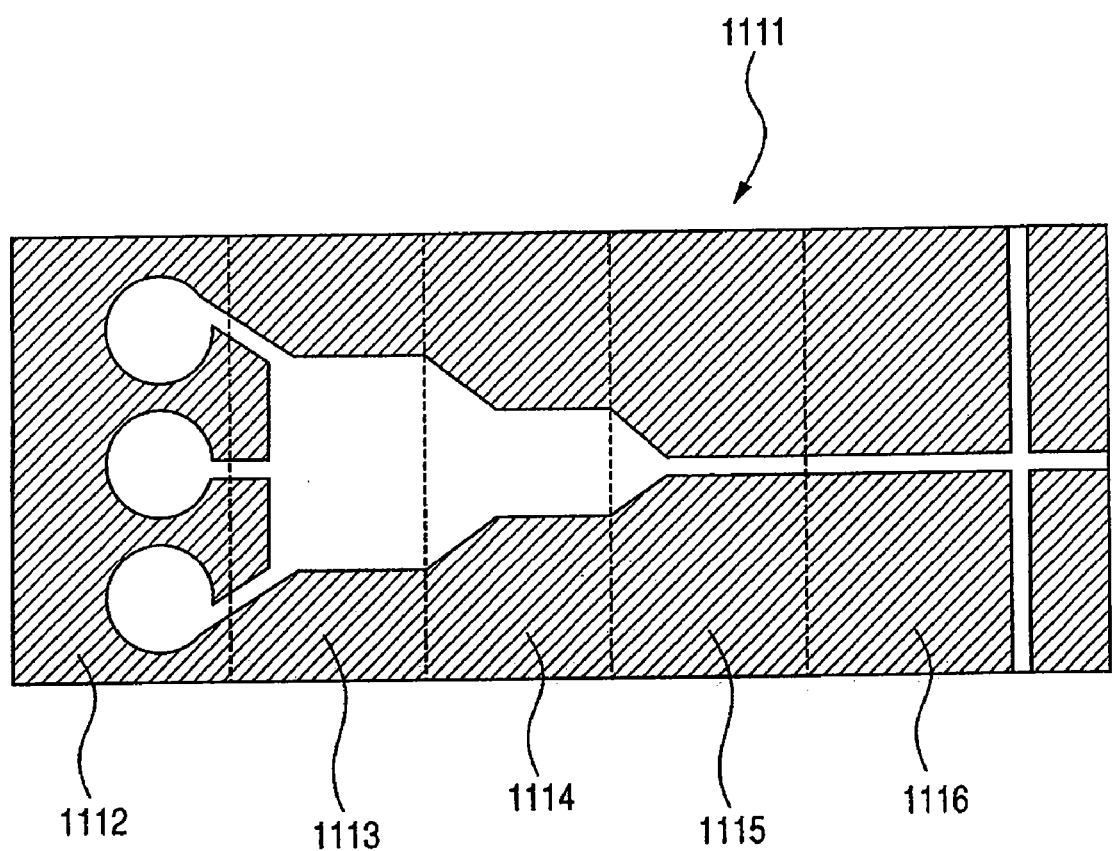
FIG. 11 illustrates conception of an μ-TAS bio-sensor chip.

This sensor device is worn on a wrist or arm with a belt 902 to detect necessary information by taking blood or a like method as shown in the step in FIG. 10 by sensor section 901, showing the detection result in display panel 903.

FIG. 10 shows briefly a typical process for obtaining necessary information. The process shown in FIG. 10 includes blood-taking step 1001 in which a small amount of blood is taken from a human body by a blood-taking needle not shown in FIG. 9; component separation/reaction step 1002 in which an objective component is separated from the blood components and a reaction necessary for the separation is caused; component-concentration/reaction step 1003 for higher detection sensitivity; detection step 1004 in which the detection is conducted at a high sensitivity by bringing the fine resonator LD of the present invention into contact with flow channel for flow of the fluid containing the concentrated objective, and the detection result is converted by calculation to intended style; and result-displaying step 1005 which displays the result at displaying panel 903.

As shown in FIG. 9 and FIG. 10, the sensor device of the present invention incorporating the micro resonator LD and the flow channel can be used for constituting a portable detection-testing device. Naturally, the body-worn sensor device of the present invention may be equipped with communication facility to a server apparatus, clock facility, photographing facility, or the like facility for a portable terminal.

Example 5

Figure 12:
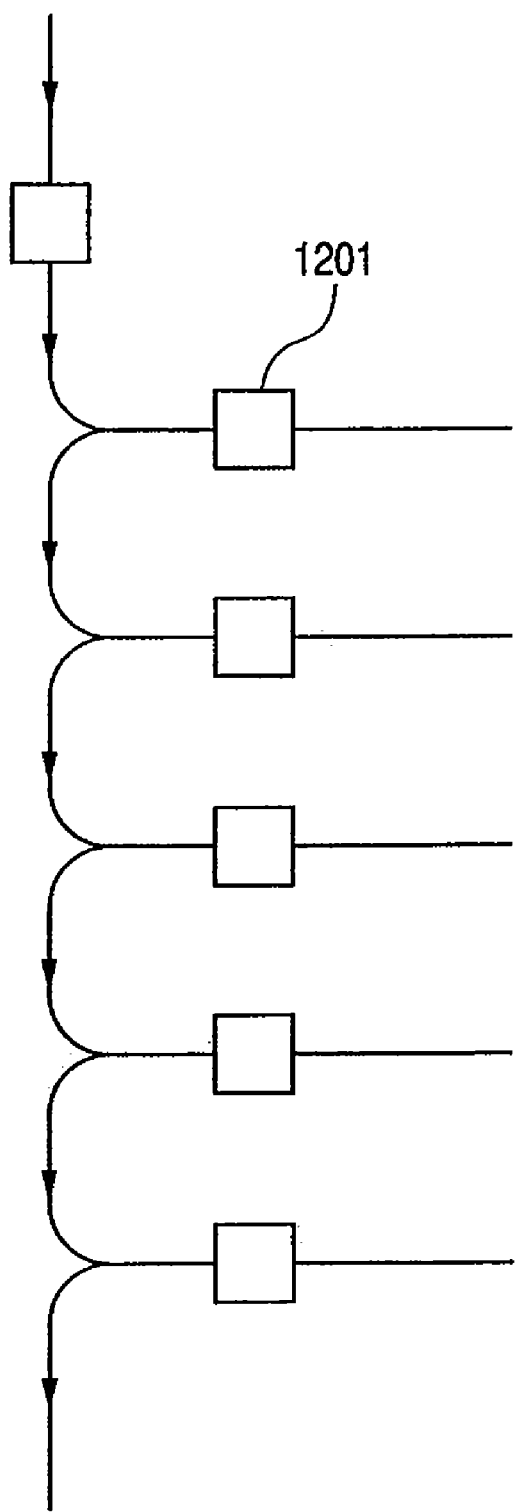
FIG. 12 illustrates conception of constitution of a sensor device with many photonic crystals of the present invention.

The constitution of Example 3 is expanded to employ three or more photonic crystal regions 1201 connected suitably to each other as shown in FIG. 12. Further, a plurality of the serial constitutions may be arranged in parallel for statistical treatment of the sensing data.

This application claims priority from Japanese Patent Application No. 2005-051997 filed on Feb. 25, 2005, which is hereby incorporated by reference herein.

What is claimed is:

1. A sensor device for detecting a substance contained in a fluid, said device comprising:
    a first photonic crystal region, a long wavelength edge of a photonic band gap of the first photonic crystal region is $\lambda 1$;
    a second photonic crystal region having a different photonic band gap from the first photonic crystal region, a short wavelength edge of a photonic band gap of the second photonic crystal region is $\lambda 2$;
    a first flow channel connected to the first photonic crystal region to allow a reference fluid to flow;
    a second flow channel connected to the second photonic crystal region to allow an objective substance-containing fluid to flow;
    an optical waveguide connected to the first photonic crystal region and the second photonic crystal region to guide the light;
    an optical source having the wavelength of the range from the $\lambda 1$ to the $\lambda 2$; and
    an optical detector for detecting the light which has been transmitted through the first photonic crystal region and has reached the second photonic crystal region and has been transmitted through or reflected by the second photonic crystal region,
    wherein the substance is detected by utilizing both a state in which a condition of $\lambda 1 > \lambda 2$ is satisfied and a state in which the condition of $\lambda 1 > \lambda 2$ is not satisfied.

2. The sensor device according to claim 1, wherein the first photonic crystal region and the second photonic crystal region are different in an optical property.

3. The sensor device according to claim 1, wherein the sensor device comprises further a light source for emitting light to be introduced into the optical waveguide.

* * * * *

UNITED STATES PATENT AND TRADEMARK OFFICE
CERTIFICATE OF CORRECTION

| | |
|---|---|
| PATENT NO. | : 7,391,945 B2 |
| APPLICATION NO. | : 11/276205 |
| DATED | : June 24, 2008 |
| INVENTOR(S) | : Mitsuro Sugita |

It is certified that error appears in the above-identified patent and that said Letters Patent is hereby corrected as shown below:

COLUMN 2:
Line 8, "renders" should read --renders it--.
Line 14, "to result" should read --resulting--.
Line 17, "to lower" should read --lowering--.

COLUMN 3:
Line 14, "transmitted" should read --been transmitted--.
Line 16, "transmitted" should read --been transmitted--.

COLUMN 4:
Line 3, "an" should read --a--.
Line 5, "an" should read --a--.
Line 27, "transmitted" should read --been transmitted--.
Line 28, "trans-" should read -- been trans- --.
Line 37, "has" should read --the--.
Line 41, "transmits" should read --is transmitted--.

COLUMN 5:
Line 6, "comprises" should read --comprise--.
Line 23, "transmitted" should read --been transmitted--.
Line 32, "transmitted" should read --been transmitted--.
Line 64, "other" should read --other, so as--.

COLUMN 7:
Line 11, "comes to be not valid." should read --becomes invalid.--.
Line 57, "the" should read --by--.
Line 58, "transmitted" should read --been transmitted--.

COLUMN 8:
Line 4, "constituted of" should read --comprising--.
Line 39, "comes to be" should read --becomes--.
Line 44, "comes to disappear" should read --disappears--.

COLUMN 9:
Line 54, "transmitted" should read --been transmitted--.

UNITED STATES PATENT AND TRADEMARK OFFICE
CERTIFICATE OF CORRECTION

PATENT NO. : 7,391,945 B2
APPLICATION NO. : 11/276205
DATED : June 24, 2008
INVENTOR(S) : Mitsuro Sugita It is certified that error appears in the above-identified patent and that said Letters Patent is hereby corrected as shown below:

COLUMN 10:
Line 11, "the both of" should read --both--.
Line 15, "light," should read --lights,--.
Line 38, "flowing" should read --flowing through--.

COLUMN 11:
Line 3, "follow" should read --flow--.

Signed and Sealed this

Third Day of February, 2009

JOHN DOLL
*Acting Director of the United States Patent and Trademark Office*